(12) United States Patent
Zagorac

(10) Patent No.: US 11,514,239 B1
(45) Date of Patent: Nov. 29, 2022

(54) CREATING RICH COMMUNICATION SERVICES (RCS) MESSAGE TEMPLATES WITH GRAPHICAL BUILD AND CONCURRENT REPRESENTATIVE DISPLAY

(71) Applicant: TeleSign Corporation, Marina del Rey, CA (US)

(72) Inventor: Ilija Zagorac, Belgrade (RS)

(73) Assignee: Telesign Corporation, Marina del Rey, CA (US)

( * ) Notice: Subject to any disclaimer, the term of this patent is extended or adjusted under 35 U.S.C. 154(b) by 0 days.

(21) Appl. No.: 17/322,531

(22) Filed: May 17, 2021

(51) Int. Cl.
G06F 40/186 (2020.01)
G06F 40/174 (2020.01)
G06F 9/451 (2018.01)
G06F 40/143 (2020.01)
G06F 3/0481 (2022.01)

(52) U.S. Cl.
CPC .......... G06F 40/186 (2020.01); G06F 3/0481 (2013.01); G06F 9/451 (2018.02); G06F 40/143 (2020.01); G06F 40/174 (2020.01)

(58) Field of Classification Search
CPC ...... G06F 40/186; G06F 9/451; G06F 40/143; G06F 40/174; G06F 3/0481
See application file for complete search history.

(56) References Cited

U.S. PATENT DOCUMENTS

| | | | |
|---|---|---|---|
| 6,769,606 B1 * | 8/2004 | Blosser | G06Q 20/209 235/379 |
| 2014/0120961 A1 * | 5/2014 | Buck | H04W 4/12 455/466 |
| 2020/0134009 A1 * | 4/2020 | Zhao | G06N 3/0445 |

OTHER PUBLICATIONS

Dove, Jackie, "What is RCS messaging? Everything you need to know about the SMS successor," <https://www.digitaltrends.com/mobile/what-is-rcs-messaging/>, May 12, 2021, pp. 1-9. (Year: 2021).*

* cited by examiner

*Primary Examiner* — Kyle R Stork
(74) *Attorney, Agent, or Firm* — Perkins Coie LLP

(57) ABSTRACT

System and method for generating RCS message templates using a graphical user interface (GUI) with concurrent representative display. Templates are generated based on inputs via an input region of the GUI. Inputs can include a template name, a template type, and message content, which can include text, images, video, interactive buttons or icons, and so forth. Inputs can be static or parameterized. A representative message based on the template is concurrently displayed in a display region of the GUI. Based on the inputs, the system generates RCS message templates, such as by compiling JSON code corresponding to the user inputs and the representative display. The templates can be used to generate and send finalized RCS messages, such as text messages, rich cards, and so forth, by invoking a generated template and providing data for any parameterized fields in the template.

20 Claims, 4 Drawing Sheets

CREATING RICH COMMUNICATION SERVICES (RCS) MESSAGE TEMPLATES WITH GRAPHICAL BUILD AND CONCURRENT REPRESENTATIVE DISPLAY

BACKGROUND

Rich Communication Services (RCS) is a communication protocol intended to replace the Short Message Service (SMS) protocol. Many devices such as mobile phones, tablets, and wearable devices can send and receive RCS messages. RCS messaging includes enhanced functions, in comparison to SMS, such as transmitting in-call media, native support for group chats, sending and receiving read receipts, sending and receiving high-resolution (e.g., uncompressed) photos and videos, and so forth. In addition, RCS messaging allows businesses to deliver customized content and interactive features within a messaging application, such as interactive buttons and delivery of content in response to user interactions. And, because of click-through options and other opportunities for engagement with RCS messages, RCS messaging allows for advanced statistics that can help marketers optimize their outbound campaigns. By contrast, for SMS messaging to approximate functionality similar to that of RCS messaging, a business can only send a SMS message with a link to a landing page that simulates the content of the RCS message, which may decrease the likelihood that a user will access the content because of the extra step of clicking the link. Because RCS offers these and other advantages, businesses may want to adopt RCS messaging for business-related communications.

Although RCS messaging provides many enhanced features compared to existing messaging protocols, unfortunately businesses have not widely adopted RCS messaging since it was introduced in 2007. For example, marketing to consumers using RCS messages remains uncommon. Businesses and other users of messaging services may not adopt RCS messaging, in part, because existing technologies make it difficult to create RCS messages suitable for business communications. For example, existing technologies may require business users to write complicated JavaScript Object Notation (JSON) programming to generate suitable RCS message templates. In addition, existing technologies may require businesses to rely on other entities to generate RCS templates for them, rather than allowing the businesses to generate RCS templates for themselves. Because of these and other problems with existing technologies, businesses may be unable to take advantage of the many benefits of RCS messaging.

Businesses may adopt RCS messaging if they are able to generate template messages suitable for business messaging without complicated programming, and without having to submit content to other parties (e.g., service providers) to generate template messages for them. Thus, there is a need for businesses to more easily generate RCS templates for business communications.

Figure 1:
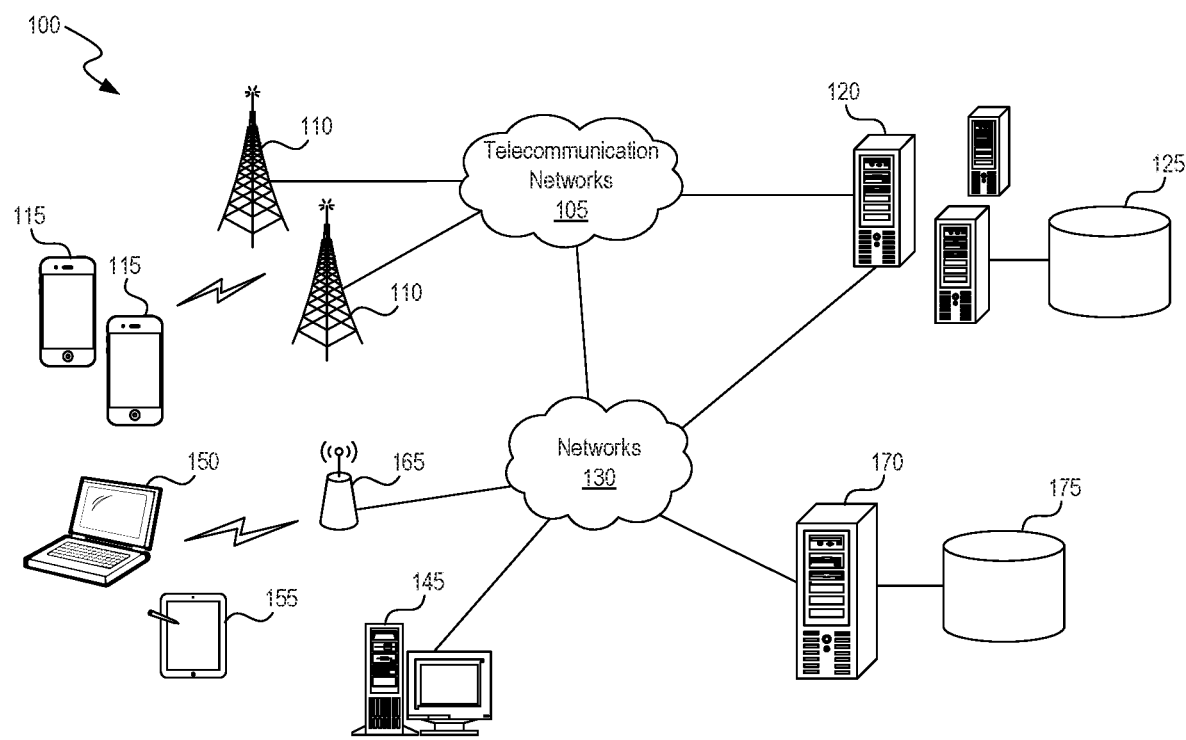
FIG. 1 is a diagram of a representative environment in which a system for creating RCS message templates with graphical build and concurrent representative display may operate.

The techniques introduced in this disclosure can be better understood by referring to the following Detailed Description in conjunction with the accompanying drawings.

DETAILED DESCRIPTION

A system and method are disclosed herein to allow users to easily generate RCS message templates using a graphical user interface (GUI). The present technology generates template messages in response to user inputs using the GUI. The GUI includes both an input region and a display region. For example, the system receives user inputs via the input region of the GUI, such as inputs for a template name, a template type selected from a predetermined set of template types, and message content based on the template type (e.g., text, images, video, interactive buttons or icons, etc.). Concurrently, the system displays, in a display region of the GUI, a representative display of an RCS message based on the user inputs in the input region of the GUI. Based on the user inputs in the input region, the system generates one or more templates (e.g., by creating JSON code corresponding to the user inputs and the representative display). The templates may then be used by the system to generate and send finalized RCS messages (e.g., text messages, rich cards, etc.) by invoking a generated template and providing data for any parameterized fields in the template.

For each RCS message template, message content may be static such that the content is the same in each message generated from the RCS message template. In addition, message content may be parameterized such that the content may differ in each message generated from the RCS message template. For parameterized message content, content is provided to the RCS message at runtime to populate fields in the message. That is, content is inserted into the RCS message after the template has been generated (e.g., in a parameterized field of the RCS message template), and before the RCS message is sent to a recipient.

In an example implementation, an airline or other travel-related business user uses the system to create RCS message templates for airline tickets. The business user enters into an input region of the GUI typical content (e.g., photos, character strings, etc.) that will appear on each message generated from the template. Static content may include business branding, labels for flight number, passenger name, boarding time, departure time, terminal, gate, seat number, and so forth. Parameterized content may include fields for a flight number, passenger name, boarding time, departure time, terminal, gate, seat number, and so forth, for which the user provides data when messages are generated from the RCS template message. Additional inputs by the business user may include the specification of suggested replies to the template message, such as a "confirm" message, and suggested actions such as a "call airline" button. As the business user enters the foregoing information at the input region of the GUI, the display region of the GUI generates a concurrent representative display showing how the message will appear to a recipient. The system then generates a template message based on the user inputs, such as by generating and storing JSON code for the template message. The business user may then use the template message to generate and send individual RCS messages.

In a further example implementation, a business providing dental services may use the GUI to create a set of RCS message templates allowing the business to schedule appointments, send appointment reminders, and receive appointment confirmations within a messaging application on a smart phone. For example, the business may use the GUI to create a first template message that may be used to generate RCS messages to send to mobile devices associated with recipients (e.g., existing or prospective clients of the business). The messages generated from the first template message may include an interactive button that allows a recipient to share the location of the mobile device associated with the recipient. In response to receiving the location of the mobile device, the message provides to the recipient, within the messaging application, a map showing the nearest location of the business and selectable buttons indicating available appointment times that the recipient may choose from. Using the GUI, the business may also generate a second template message that may be used to generate messages reminding recipients of scheduled appointments. A message generated from the second template message may remind the recipient of an upcoming appointment and include interactive buttons to confirm the appointment or reschedule the appointment. In response to a recipient selecting the interactive button to reschedule the appointment, the message generated from the second template message provides selectable buttons indicating available appointment times that the recipient may choose from to reschedule the appointment. By doing so, the business is able to provide an enhanced user experience within the messaging application in a superior manner to that available using simple SMS messaging.

While the present technology is described in the context of business messaging (e.g., notifications, reminders, alerts, etc.), it can also be used in many other contexts or implementations. For example, governmental entities may wish to generate RCS message templates, such as for emergency alerts or other communications. Additionally, educational institutions may have a need for the present technology, such as for sending notifications or alerts to students. In general, the present technology may be applied in any context where it is necessary or desirable to generate RCS messages based on templates.

Advantages of the present technology include simplified creation of customized RCS message templates. For example, using this technology businesses can generate template messages without reliance on a different entity to generate the templates for them. And businesses can create RCS message templates without having to manually code the template themselves. In addition, the present technology will increase and improve opportunities for businesses to engage with consumers because the enhanced features of RCS messages increase the likelihood of user engagement. Moreover, the interactive features of RCS messages allow for advanced statistics and other metrics of user engagement beyond read receipts. Thus, the present disclosures describe technological improvements at least because they provider easier and enhanced methods for businesses to generate RCS templates and better engage with customers.

Various implementations of the technology will now be described. The following description provides specific details for a thorough understanding and an enabling description of these implementations. But a person skilled in the art will understand that the present invention may be practiced without many of these details. Additionally, some well-known structures or functions may not be shown or described in detail to avoid unnecessarily obscuring the relevant description of the various implementations. The terminology used in this application is intended to be interpreted in its broadest reasonable manner, even though it is being used in conjunction with a detailed description of certain specific implementations of the invention.

FIG. 1 and the following discussion provide a general description of an example environment 100 in which a system for generating RCS message templates using a GUI with concurrent representative display may operate. Although not required, aspects of the system are described in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions described in this application. The terms "computer" and "computing device," as used generally in this application, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the system can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the system described in this application may be stored or distributed on tangible, non-transitory computer-readable media, including magnetic and optically readable and removable computer discs, stored in firmware in chips (e.g., EEPROM chips). Alternatively, aspects of the system may be distributed electronically over the Internet or over other networks (including wireless networks). Those skilled in the relevant art will recognize that portions of the system may reside on a server computer, while corresponding portions may reside on a client computer.

The example environment 100 includes multiple communications paths by which a business and its customers may interact, such as using a mobile device 115, a personal computing device 145, a laptop computer 150, tablet computers 155, or wearable devices (not pictured) (collectively, "customer devices"). The customer devices are capable of executing applications or other software such as messaging applications that can send and receive RCS messages. The customer devices may interact with one another and with businesses or other entities by accessing one or more networks 130 or telecommunication networks 105. Networks 130 may be wired or wireless, public or private, including, for example, the Internet. Networks 130 may be accessed, for example, via wireless hotspots 165 that operate in accordance with the WiFi standard (IEEE 802.11). Telecommunication networks may be accessed, for example, via base stations 110 using a wireless mobile telephone standard, such as the Global System for Mobile Communications (GSM), Long Term Evolution (LTE), or another wireless standard. While depicted as separate networks in FIG. 1, it will be appreciated that data networks 130 and telecommunication networks 105 may overlap or share network components, in whole or in part.

Businesses, such as consumer-facing businesses (e.g., retailers, travel and tourism businesses, financial providers, health care providers, other professional service providers, etc.), may operate or utilize one or more servers 170 coupled to one or more data storage areas 175. The servers 170 may be used, for example, to provide a website or other computer-accessible resource, and to communicate to the customer devices, such as by sending and receiving messages. The data storage area 175 may be used to store information such as customer information (e.g., phone numbers, email addresses, or other information), business records, and other data usable to populate RCS messages.

A service, such as a cloud computing service or platform-based service, may be used to provide the disclosed system for generating RCS message templates using a GUI with concurrent representative display. The system may be implemented using one or more servers 120 coupled to data storage areas 125. For example, as further described in this application, the described GUI may be provided via the servers 120, and the generated template RCS messages may be stored in the storage area 125, or in the data storage area 175. In some implementations, the generated RCS messages are stored in the storage area 125 and corresponding references to the RCS messages are stored in the data storage area 175. Businesses may transmit messages, e.g. to the customer devices, generated from the RCS message templates using server 170 (e.g., the templates being populated with data being received by the server 170 via an API), or the service may transmit the messages using servers 120, such as by an application-to-person messaging application. The disclosed system may reside, in whole or in part, on the servers 120 coupled with the data storage areas 125. The data storage areas 125 may store one or more software modules capable of performing all or portions of the methods disclosed herein, such as software capable of generating the disclosed GUI and software capable of creating JSON code for template RCS messages.

Figure 2A:
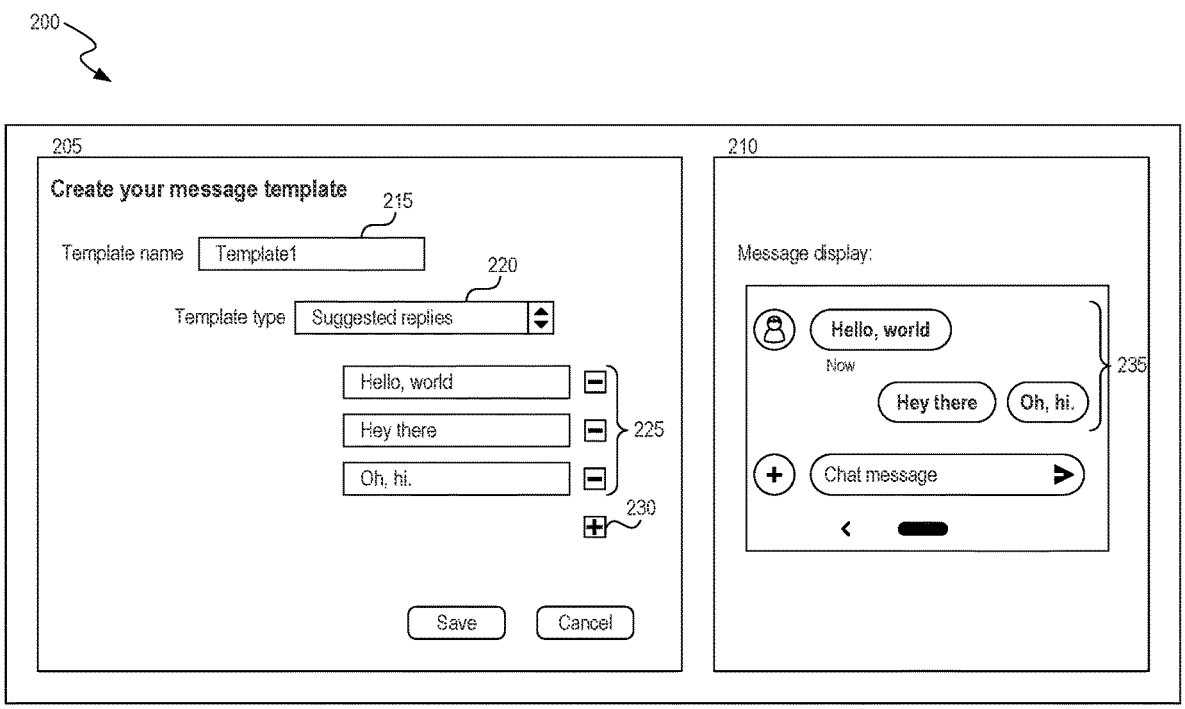
FIGS. 2A and 2B are examples of graphical user interfaces (GUIs) implementing features of the described technology.

FIG. 2A depicts an example GUI 200 that is generated by the system and that allows users to build RCS message templates using a GUI with concurrent representative display. The GUI 200 comprises an input region 205 and a concurrent representative display region 210. At the input region 205, a user provides inputs regarding desired content of a template RCS message. For example, the GUI includes a template name field 215 to allow a user to provide a template name. The GUI also includes a drop-down template type menu 220 to allow the user to specify the type of template that they would like to build. The template type is chosen from a predetermined set of RCS message types, such as a text message (i.e., a message containing only text), a media message (i.e., a message that includes audio, video, or a photo), a suggested reply message (i.e., a message that includes one or more replies that are selectable by a user), a suggested action message (i.e., a message that includes one or more actions that a recipient may select, such as dialing a phone number, sharing a device location, etc.), rich cards or rich card carousels (i.e., templates that include business cards with at least one image, or a certain number of scrollable cards).

Based on the template type selected by the user from drop-down menu 220, the system displays in input region 205 one or more fillable or selectable fields 225. For example, if the template type is a "suggested reply" template (as depicted in FIG. 2A), then the system will display input fields 225 to allow the user to enter text for the message and the suggested replies. The displayed input fields may allow for static message content, parameterized message content, or both. In the suggested reply template, the first input field 225 is the message transmitted to the recipient and the additional input fields 225 are the replies that the recipient may select from in the message. As shown in FIG. 2A, the user has entered "Hello, world" as the message text to the recipient, and has entered the suggested replies "Hey there" and "Oh, hi" from which the recipient of the message may choose. If the user would like to include more than two suggested replies, the user may select add button 230 to add additional input fields 225 for reply entry.

While the template depicted in FIG. 2A only includes suggested replies, it will be appreciated that other template types may include other actions. For example, the selected template type may allow a user to specify both suggested replies and suggested actions.

As the user constructs the message template in input region 205, the system generates and provides a concurrent display of the constructed message in display region 210. For example, when the user populates the first input field 225 with the text "Hello, world," that text is displayed in the display region 210 as a new message 235. As the user enters the text "Hey there" and "Oh, Hi" as possible responses to send in second and third input fields 225, those responses are similarly displayed by the system in new message 235. The technology therefore allows a user to build a RCS message template and concurrently view a representative message generated from the RCS message template. Doing so provides immediate feedback to the user of the message format and content, allowing the user to modify message components and quickly arrive at a desired message for use.

Figure 2B:
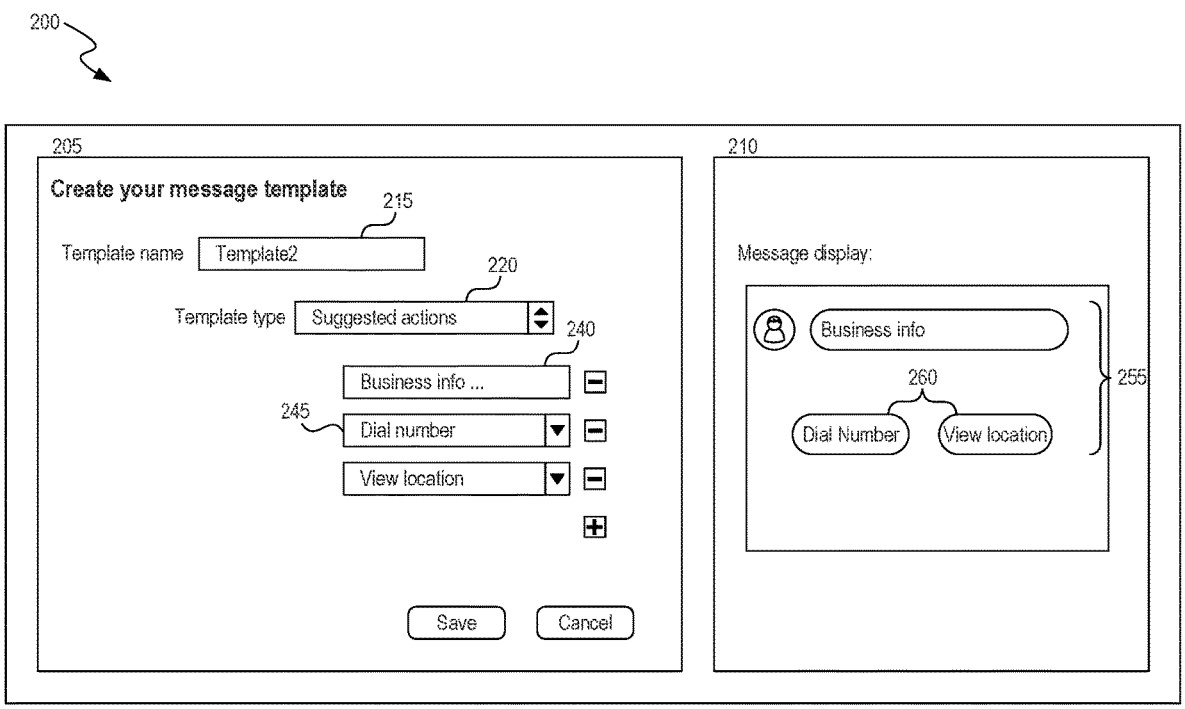

FIG. 2B depicts GUI 200 in which the user has selected a different template type than the user selected in FIG. 2A. In FIG. 2B, the user has selected a "suggested actions" template type using drop-down template type menu 220. Based on the selected template type, the system has displayed various fillable or selectable fields in the input region 205. In a suggested actions template, a first fillable field 240 allows a user to specify the message text that will be sent to a recipient. As shown in FIG. 2B, the user has entered a business name and various information about the business (e.g., the business address, hours of operation, phone number) as the message text to the recipient. The suggested actions template then provides a drop-down menu 245 that allows the user to specify one or more actions that can be executed by the recipient directly from the received message. In the depicted example, the user has used the drop-down menu to select two different actions 250 that will be displayed to the recipient of the message. The first action is a "dial number" action, which when selected by the recipient will cause the recipient's device to call a number associated with the business. The second action is a "view location" action, which when selected by the recipient will cause the recipient's device to trigger the opening of a mapping service/application with the location of the business address displayed by that service. If the user would like to include additional actions, the user may select add button 230 to add additional actions to the message.

While two suggested actions are depicted in FIG. 2B, it will be appreciated that other types of actions may be allowed by the system. For example, suggested actions may include confirming an appointment (where the appointment details are provided in the sent message), adding a calendar reminder, rescheduling an appointment, and so forth. In addition, other input fields may be provided by the system to allow additional static message content, parameterized message content, or both to be displayed to a recipient in the message.

As the user constructs the message template in input region 205, the system generates and provides a concurrent display of the constructed message in display region 210. For example, when the user populates the fillable field 240 with the business name and details, the provided text is displayed in the display region 210 as a new message 255. As the user selects the "dial number" and "view location" actions using drop-down menu 245, those actions are depicted in message 255 as selectable buttons 260. Doing so provides immediate feedback to the user of the message format and content, allowing the user to modify message components and quickly arrive at a desired message for use.

Figure 3:
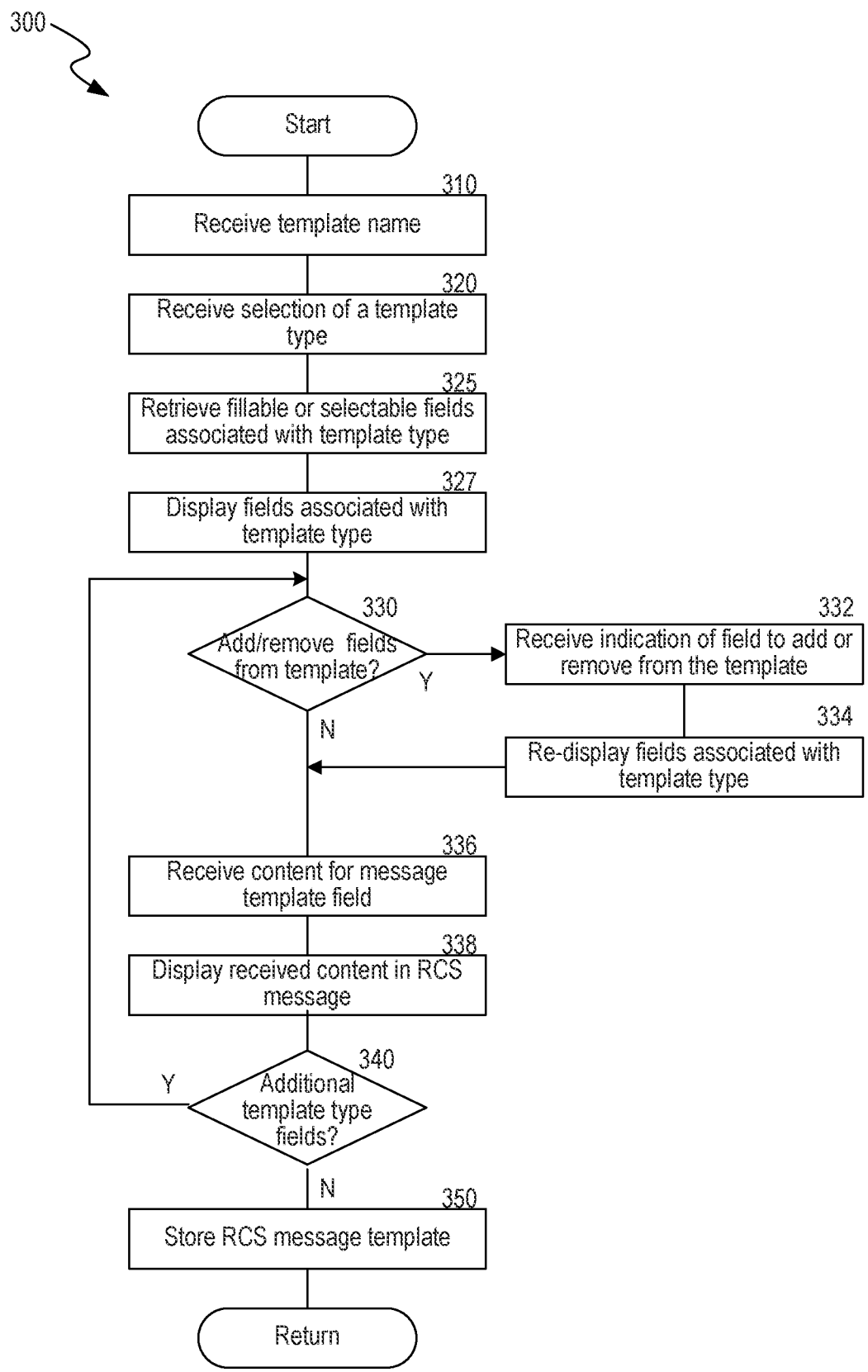
FIG. 3 is a flow diagram illustrating a method for creating RCS message templates with graphical build and concurrent representative display.

FIG. 3 is a flow diagram of an example process 300 implemented by the system for generating RCS message templates using a GUI with concurrent representative display. In general, the process includes receiving a template name, receiving a template type, retrieving and displaying fillable or selectable fields associated with the template type, receiving content for each message template field, concurrently displaying a representative RCS message, and storing an RCS message template.

The process begins at a block 310, where the system receives an RCS message template name from a user. For example, the template name may be a character string differentiating the template from other templates having different names. Alternatively, the system may auto-generate a unique template name for a user to allow templates to be distinguished from each other and later identified for use or further editing.

At a block 320, the system receives a selection of a template type from the user. A template type may be previously designed by a system operator or by the system user, and may contain any combination of text, media, suggested replies, suggested actions, resource links, and so forth, as described above. Template types may be organized by the user based on particular functions that the template is intended to facilitate. For example, the system may maintain multiple templates associated with providing business locations and instructions to recipients, or the system may maintain multiple templates associated with providing appointment information to a recipient. In some implementations, the system may allow a system user to construct new template types that can be subsequently used to create specific messages.

At a block 325, the system retrieves the set of fillable or selectable fields that are associated with the selected template type. The system may store the content of each template in a dataset, with each template including the template name and associated fields. The following Table 1 provides a representative example of a template type storage structure:

| Template Type | Field #1 | Field #2 | ... | Field #N |
|---|---|---|---|---|
| Business Info - Ver. A | Message Text | Message Graphic | n/a | n/a |
| Business info - Ver. B | Message Text | Suggested Action | Suggested Action | n/a |
| Appt Reminder - Ver. A | Message Graphic | Message Text | Suggested Reply | Suggested Reply |
| Etc. | | | | |

At a block 327, the system displays the fields that are associated with the selected template type to the user. As previously described, the fields are displayed in the input region 205 of the graphical user interface. The message content input fields are displayed based on the template types, and each field may have a different graphical treatment as it is displayed to the user. For example, a suggested replies template type may display multiple text input fields, each input field corresponding to one of multiple suggested RCS reply messages from which a message recipient may select (e.g., by clicking an icon in the GUI). The input fields may allow for text inputs, photo inputs or uploads, media inputs (e.g., video or audio), selection of actions, selection of desired replies, and so forth. For example, inputs may include character strings, file paths for media (e.g., photos, video, audio, GIFs, etc.), or dragging and dropping a file such as a photo into a field. The input fields may allow for static message content, parameterized message content, or both. The user specifies the parameterized message content by linking the field with the data source from which the message content is drawn at the time of message creation.

Although starting with a template type, the user is able to modify the template by adding or removing fields in the template. At a block 330, the system receives input from the user as to whether a field should be added to or deleted from the template. For example, if the user wishes to add an additional suggested action to an RCS template type, the user can select an "add field" button to add a fillable or selectable field for a suggested action. As another example, if the user wishes to remove a field, the user can select a "remove field" button to indicate that a field is to be removed. In response to receiving the selection to add or remove a fillable or selectable field, processing continues to a block 332 where the system receives an indication from the user of the field to add or remove from the template. The user may select the field from a list of fields, from a drop-down menu, or from another editing interface. After receiving the user indication of the field to add or delete, at a block 334 the system displays the updated template, including the added field or omitting the removed field.

At a block 336, the system receives input from a user associated with one of the displayed fields in input region 205 of the graphical user interface. That is, the system receives from the user either responsive data to a field that allows text, linked data, graphics, or other data from the user and/or a selection by a user from a menu or other control associated with a displayed field.

At a block 338, upon receiving input from the user associated with one of the displayed template fields, the system generates a display of corresponding content in a representative RCS message. To do so, the system utilizes code associated with each message element and the input from the user to generate and display that portion of the message. For example, for each template type, the system may maintain a table with links to the code necessary to generate a message of that template type. The following table is an example table that is maintained for the "Business Info—Ver. A" template type:

| Template Type | Business Info - Ver. A |
|---|---|
| Message Text | {<br>　"phone_number": "+38005553123,<br>　"channels": [<br>　　{<br>　　　"channel"; "rcs",<br>　　　"fallback _time": 30<br>　　}<br>　],<br>　"message": {<br>　　"rcs": {<br>　　　"template": "text",<br>　　　"parameters": {<br>　　　　"text": "This is RCS message"<br>　　　}<br>　　}<br>　},<br>　"message_type": "MKT"<br>} |
| Message Graphic | {<br>　"phone_number: "+38005553123",<br>　"channels": [<br>　　{<br>　　　"channel": "rcs",<br>　　　"fallback_time: 30<br>　　}<br>　],<br>　"message": {<br>　　"rcs": {<br>　　　"template": "media",<br>　　　"parameters": {<br>　　　　"url": "enter URL"<br>　　　}<br>　　}<br>　},<br>　"message_type": "MKT"<br>} |

Based on the received user input at block 336, the system displays a corresponding portion of the RCS message in the display region 210. To do so, the system identifies the corresponding template code (e.g., JSON code) associated with the field that was completed by the user. For example, if the user entered text into a template text field, the system will execute code associated with that text field to display the entered text in display region 210 as if the entered text was being sent to the user in an RCS message. The display region 210 may be generated by emulating the coding execution as if generated in the execution environment. As another example, if the user provided a link in a template field to a graphical logo that was to be displayed in the RCS message, the system will execute code associated with that template field to display the linked graphical logo in display region 210 as if the linked graphical logo was being sent to the user in an RCS message. In some embodiments, the RCS message is generated by the system as the user completes each of the fields to allow the user to better visualize the RCS message as it is constructed. In some embodiments, the RCS message is generated by the system after the user completes two or more of the fields associated with the template type.

In some implementations, the concurrent representative display may be configurable by the user, such as by changing the dimensions of the display, clicking and dragging components within the concurrent representative display, or selecting actionable icons or buttons within the concurrent representative display (e.g., to copy, paste, delete or resize objects in the display, etc.). The concurrent representative display is based on at least the received template type and the received message content.

At decision block 340, the system determines whether any additional fields in the selected template type remain to be completed. If additional fields remain to be completed, processing continues at block 336 where the system waits to receive content associated with another of the displayed fields. If no additional fields remain to be completed in the selected template type, processing continues to a block 350.

At a block 350, the system stores the constructed RCS message template for subsequent use by the user. Because the RCS message template has a unique identifier that is provided by the user or by the system, the user may subsequently edit or change fields in the RCS message template. The stored RCS message template is based on at least the received template type and received message content. Generating a template RCS message may include, for example, storing a compilation of the JSON code associated with each field of the template type as well as the corresponding message content entered by the user. When the RCS message template is subsequently used in a message or message campaign associated with the user, the system accesses the message template, populates the message with any updated dynamic content, and then transmits the message to the recipient.

The depicted process 300 shown in FIG. 3 represents just one embodiment of a system for generating RCS message templates using a GUI with concurrent representative display. In other embodiments, the operations of process 300 can be altered while still maintaining a similar functionality, and without deviating from the teachings of the present invention. For example, operations may be added, such as transmitting the generated template RCS message to a user who may subsequently use the template to generate RCS messages. Additional operations may include generating and sending finalized rich cards by invoking a generated template and providing data for any parameterized fields in the generated template. For example, after generating a template message using the GUI, the technology may allow a user to select a template from which to create a message. The user may then provide parameters to populate fields of the template message (e.g., strings, images, etc.), and send the messages, such as by using an application-to-person messaging service.

In general, the detailed description of embodiments of the present technology is not intended to be exhaustive or to limit the present technology to the precise form disclosed above. While specific embodiments of, and examples for, the present technology are described above for illustrative purposes, various equivalent modifications are possible within the scope of the present technology, as those skilled in the relevant art will recognize. For example, while processes (or steps) or blocks are presented in a certain order, alternative embodiments can perform routines having steps, or employ systems having blocks, in a different order, and some processes or blocks can be deleted, moved, added, subdivided, combined, and/or modified. Each of these processes or blocks may be implemented in a variety of different ways. Also, while processes or blocks are at times shown as being performed in series, these processes or blocks may instead be performed in parallel, or can be performed at different times.

These and other changes can be made to the disclosed technology in light of the above Detailed Description. While the above description describes certain examples of the disclosed technology, no matter how detailed the above appears in text, the disclosed technology can be practiced in many ways. Details of the system and method may vary considerably in their specific implementations, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. In general, the terms used in the following claims should not be construed to limit the disclosed technology to the specific examples disclosed in the specification, unless the above Detailed Description section explicitly defines such terms.

I claim:

1. A computer-implemented method for generating a rich communication services (RCS) message template with concurrent display of a representative RCS message, the method comprising:
   receiving, from a user via a graphical user interface (GUI), a template type for an RCS message template, the template type specifying a plurality of fillable fields for receiving content that is to be displayed in an RCS message constructed using the RCS message template, wherein the template type is received at an input region of the GUI;
   displaying, in the input region of the GUI and based on the received template type,
   the plurality of fillable fields,
      wherein each field of the plurality of fillable fields allows the user to provide a corresponding input to that field specifying the content to be displayed in the constructed RCS message;
   receiving, from the user via the input region of the GUI, multiple inputs, each input corresponding to a fillable field of the displayed plurality of fillable fields;
   concurrently displaying in a concurrent representative display region of the GUI, as the multiple inputs are received from the user via the input region of the GUI, a representative RCS message based on the received inputs,
      wherein the representative RCS message is generated using the received multiple inputs and template code retrieved for the fillable fields based on the received template type,
      wherein, for each of the fillable fields, the corresponding template code is executed as the corresponding input is received, and
      wherein the representative RCS message is displayed at the concurrent representative display region of the GUI to simulate a message generated using the RCS message template; and
   generating, based on the received template type and the received multiple inputs corresponding to each of the displayed fillable fields, the RCS message template.

2. The computer-implemented method of claim 1 wherein the received RCS template type is at least one of a text message type, a suggested reply type, a suggested action type, and a media message type.

3. The computer-implemented method of claim 1 wherein generating the RCS message template includes aggregating code associated with each of the plurality of fillable fields.

4. The computer-implemented method of claim 1 wherein the received multiple inputs include at least one of a character string, a photo, a video, or an audio file.

5. The computer-implemented method of claim 1 further comprising:
   generating at least one RCS message based on the generated RCS message template; and
   transmitting the generated at least one RCS message to a recipient.

6. The computer-implemented method of claim 5 wherein generating at least one RCS message based on the generated RCS message template includes receiving at least one parameterized input for the generated at least one RCS message.

7. The computer-implemented method of claim 1 wherein the received multiple inputs include at least one static input and at least one parameterized input.

8. The computer-implemented method of claim 1, further comprising receiving a name for the RCS message template from the user.

9. The computer-implemented method of claim 1, wherein the input to a field is content corresponding to that field or selectable options associated with that field.

10. The computer-implemented method of claim 1, wherein executing the code associated with each of the fillable fields utilizes JavaScript Object Notation (JSON) code.

11. A non-transitory computer-readable medium carrying instructions configured to cause one or more processors to perform operations for generating a rich communication services (RCS) message template with concurrent display of a representative RCS message, the operations comprising:
   receiving, from a user via a graphical user interface (GUI), a template type for an RCS message template, the template type specifying a plurality of fillable fields for receiving content that is to be displayed in an RCS message constructed using the RCS message template, wherein the template type is received at an input region of the GUI;
   displaying, in the input region of the GUI and based on the received template type, the plurality of fillable fields, wherein each field of the plurality of fillable fields allows the user to provide a corresponding input to that field specifying content to be displayed in the constructed RCS message;
   receiving, from the user via the input region of the GUI, multiple inputs, each input corresponding to a fillable field of the displayed plurality of fillable fields;
   concurrently displaying in a concurrent representative display region of the GUI, as the multiple inputs are received from the user via the input region of the GUI, a representative RCS message based on the received inputs,
      wherein the representative RCS message is generated using the received multiple inputs and template code retrieved for the fillable fields based on the received template type,
      wherein, for each of the fillable fields, the corresponding template code is executed as the corresponding input is received, and
      wherein the representative RCS message is displayed at the concurrent representative display region of the GUI to simulate a message generated using the RCS message template; and
   generating, based on the received template type and the received multiple inputs corresponding to each of the displayed fillable fields, the RCS message template.

12. The non-transitory computer-readable medium of claim 11 wherein the received RCS template type is at least one of a text message type, a suggested reply type, a suggested action type, and a media message type.

13. The non-transitory computer-readable medium of claim 11 wherein generating the RCS message template includes aggregating code associated with each of the plurality of fillable fields.

14. The non-transitory computer-readable medium of claim 11 wherein the received multiple inputs include at least one of a character string, a photo, a video, or an audio file.

15. The non-transitory computer-readable medium of claim 11 wherein the operations further comprise:
generating at least one RCS message based on the generated RCS message template; and
transmitting the generated at least one RCS message to a recipient.

16. The non-transitory computer-readable medium of claim 15 wherein generating at least one RCS message based on the generated RCS message template includes receiving at least one parameterized input for the generated at least one RCS message.

17. The non-transitory computer-readable medium of claim 11 wherein the received multiple inputs include at least one static input and at least one parameterized input.

18. The non-transitory computer-readable medium of claim 11 wherein the operations further comprise receiving a name for the RCS message template from the user.

19. The non-transitory computer-readable medium of claim 11 wherein the input to a field is content corresponding to that field or selectable options associated with that field.

20. The non-transitory computer-readable medium of claim 11 wherein executing the code associated with each of the fillable fields utilizes JavaScript Object Notation (JSON) code.

* * * * *